(12) United States Patent
van der Merwe

(10) Patent No.: US 11,960,944 B2
(45) Date of Patent: Apr. 16, 2024

(54) INTERPROCESSOR PROCEDURE CALLS

(71) Applicant: Sophos Limited, Abingdon (GB)

(72) Inventor: Dirk Jacobus van der Merwe, Vancouver, WA (US)

(73) Assignee: Sophos Limited, Abingdon (GB)

( * ) Notice: Subject to any disclaimer, the term of this patent is extended or adjusted under 35 U.S.C. 154(b) by 205 days.

(21) Appl. No.: 17/532,178

(22) Filed: Nov. 22, 2021

(65) Prior Publication Data

US 2022/0374294 A1 Nov. 24, 2022

Related U.S. Application Data

(60) Provisional application No. 63/191,473, filed on May 21, 2021.

(51) Int. Cl.
*G06F 9/54* (2006.01)
*G06F 9/48* (2006.01)
*G06F 13/16* (2006.01)
*G06F 13/28* (2006.01)
*G06F 13/42* (2006.01)
*H04L 9/40* (2022.01)

(52) U.S. Cl.
CPC ............ *G06F 9/544* (2013.01); *G06F 9/4812* (2013.01); *G06F 9/547* (2013.01); *G06F 13/1673* (2013.01); *G06F 13/28* (2013.01); *G06F 13/4282* (2013.01); *H04L 63/0209* (2013.01); *G06F 2209/544* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 2006/0277341 A1* | 12/2006 | Johnson | ............... G06F 21/6227 710/200 |
| 2009/0113531 A1 | 4/2009 | Emmerich et al. | |
| 2012/0170581 A1 | 7/2012 | Li | |
| 2013/0227670 A1 | 8/2013 | Ahmad et al. | |
| 2019/0278922 A1* | 9/2019 | Levin | ................... H04L 63/1433 |
| 2022/0337555 A1 | 10/2022 | Gol et al. | |

OTHER PUBLICATIONS

USPTO, "U.S. Appl. No. 17/532,128 Non-Final Office Action mailed Oct. 26, 2023", 16 pages.

* cited by examiner

*Primary Examiner* — Craig C Dorais
(74) *Attorney, Agent, or Firm* — Strategic Patents, P.C.

(57) ABSTRACT

A firewall host uses a shared memory to pass arguments to, and receive results from, a remote procedure executing on a locally coupled network processing unit that offloads processing for the firewall.

23 Claims, 11 Drawing Sheets

INTERPROCESSOR PROCEDURE CALLS

CROSS-REFERENCE TO RELATED APPLICATIONS

This application claims priority to U.S. Provisional Application No. 63/191,473 filed on May 21, 2021, the entire contents of which are hereby incorporated by reference.

FIELD

The present disclosure relates to network communications.

BACKGROUND

Firewalls can usefully monitor network traffic at various locations within an enterprise network and apply rules to network traffic in order to improve or maintain network security. However, as firewall rules and security countermeasures become increasingly complex, there remains a need for a firewall system that offloads monitoring of network flows by a firewall to other networking hardware.

SUMMARY

A firewall host uses a shared memory to pass arguments to, and receive results from, a remote procedure executing on a locally coupled network processing unit that offloads processing for the firewall.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

Figure 1:
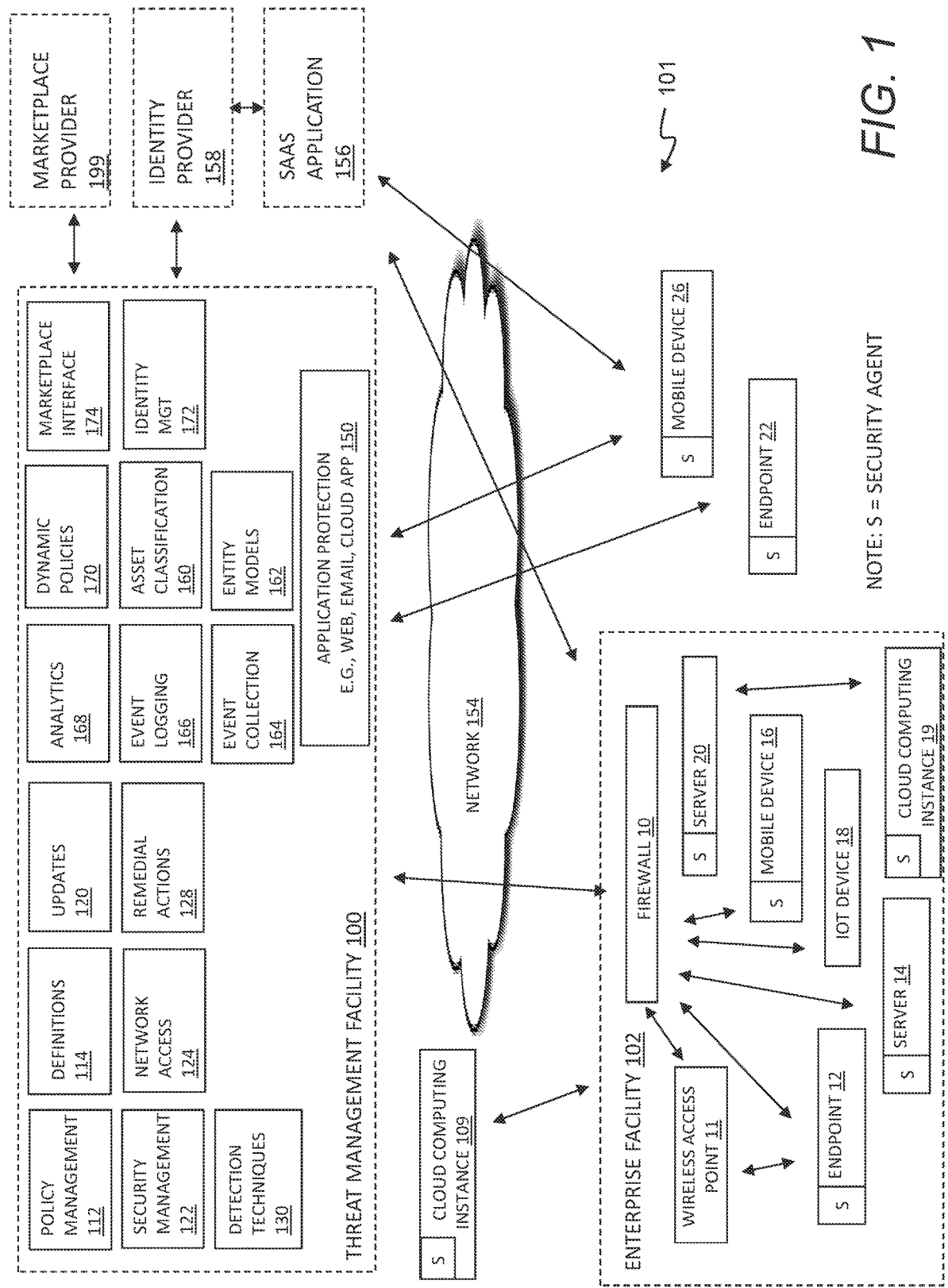
FIG. 1 depicts a block diagram of a threat management system.

FIG. 1 depicts a block diagram of a threat management system 101 providing protection against a plurality of threats, such as malware, viruses, spyware, cryptoware, adware, Trojans, spam, intrusion, policy abuse, improper configuration, vulnerabilities, improper access, uncontrolled access, and more. A threat management facility 100 may communicate with, coordinate, and control operation of security functionality at different control points, layers, and levels within the system 101. A number of capabilities may be provided by a threat management facility 100, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats. In embodiments, the threat management facility 100 may provide protection from a variety of threats to a variety of compute instances in a variety of locations and network configurations.

Just as one example, users of the threat management facility 100 may define and enforce policies that control access to and use of compute instances, networks and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 100 may provide many different services, and policy management may be offered as one of the services.

Turning to a description of certain capabilities and components of the threat management system 101, an exemplary enterprise facility 102 may be or may include any networked computer-based infrastructure. For example, the enterprise facility 102 may be corporate, commercial, organizational, educational, governmental, or the like. As home networks get more complicated, and include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown is merely exemplary, and it will be understood that there may be any number of compute instances, less or more of each type of compute instances, and other types of compute instances. As shown, the exemplary enterprise facility includes a firewall 10, a wireless access point 11, an endpoint 12, a server 14, a mobile device 16, an appliance or IOT device 18, a cloud computing instance 19, and a server 20. Again, the compute instances 10-20 depicted are exemplary, and there may be any number or types of compute instances 10-20 in a given enterprise facility. For example, in addition to the elements depicted in the enterprise facility 102, there may be one or more gateways, bridges, wired networks, wireless networks, virtual private networks, other compute instances, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In embodiments, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As non-limiting examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 158 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 172 may communicate hygiene, or security risk information, to the identity provider 158. The identity management facility 172 may determine a risk score for a user based on the events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

In embodiments, threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as a SaaS application 156. The SaaS application 156 may be an application that is used by but not operated by the enterprise facility 102. Exemplary commercially available SaaS applications 156 include Salesforce, Amazon Web Services (AWS) applications, Google Apps applications, Microsoft Office 365 applications and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination of these.

In embodiments, aspects of the threat management facility 100 may be provided as a stand-alone solution. In other embodiments, aspects of the threat management facility 100 may be integrated into a third-party product. An application programming interface (e.g., a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an embodiment, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an embodiment, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

In an embodiment, the security management facility 122 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

In an embodiment, the security management facility 122 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

In an embodiment, the security management facility 122 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In embodiments, some reputation information may be stored on a compute instance 10-26, and other reputation data available through cloud lookups to an application protection lookup database, such as may be provided by application protection 150.

In embodiments, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In embodiments, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Exemplary rules include access permissions associated with networks, applications, compute instances, users, content, data, and the like. The policy management facility 112 may use a database, a text file, other data store, or a combination to store policies. In an embodiment, a policy database may include a block list, a black list, an allowed list, a white list, and more. As a few non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

In embodiments, the threat management facility 100 may provide configuration management as an aspect of the policy management facility 112, the security management facility 122, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

In embodiments, the threat management facility 100 may also provide for the isolation or removal of certain applications that are not desired or may interfere with the operation of a compute instance 10-26 or the threat management facility 100, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 112 may also require update management (e.g., as provided by the update facility 120). Update management for the security facility 122 and policy management facility 112 may be provided directly by the threat management facility 100, or, for example, by a hosted system. In embodiments, the threat management facility 100 may also provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In an embodiment, the policy management facility 112 and the security facility 122 may work in concert with the update management facility 120 to provide information to the enterprise facility's 102 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 114 of the threat management facility 100 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need to know, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In an embodiment, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An exemplary event may be communication of a specific packet over the network. Another exemplary event may be identification of an application that is communicating over a network.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility Observations or inferences about events may also be logged by the event logging facility 166.

When a threat or other policy violation is detected by the security management facility 122, the remedial action facility 128 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Figure 2:
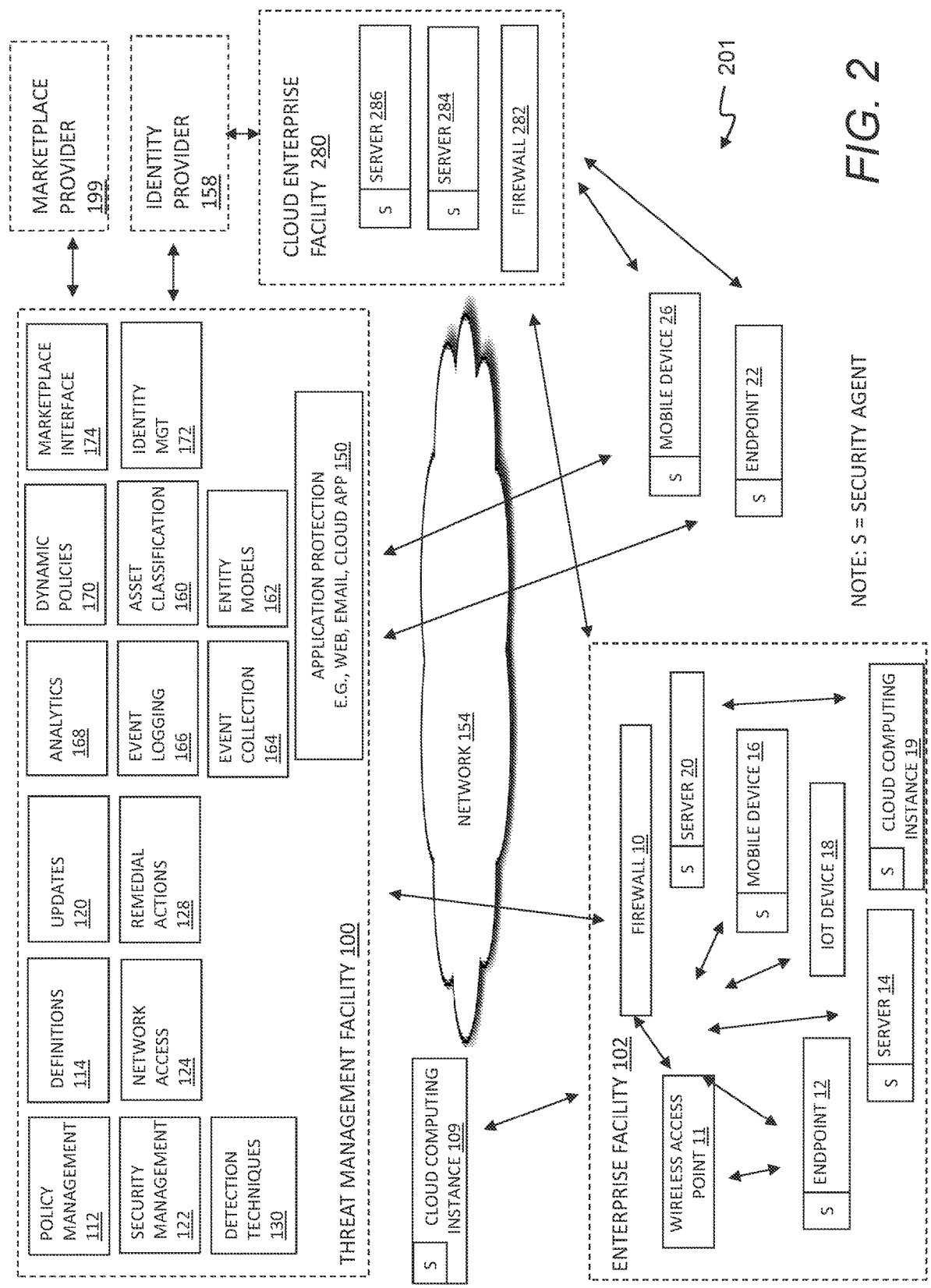
FIG. 2 depicts a block diagram of a threat management system.

FIG. 2 depicts a block diagram of a threat management system 201 such as any of the threat management systems described herein, and including a cloud enterprise facility 280. The cloud enterprise facility 280 may include servers 284, 286, and a firewall 282. The servers 284, 286 on the cloud enterprise facility 280 may run one or more enterprise applications and make them available to the enterprise facilities 102 compute instances 10-26. It should be understood that there may be any number of servers 284, 286 and firewalls 282, as well as other compute instances in a given cloud enterprise facility 280. It also should be understood that a given enterprise facility may use both SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
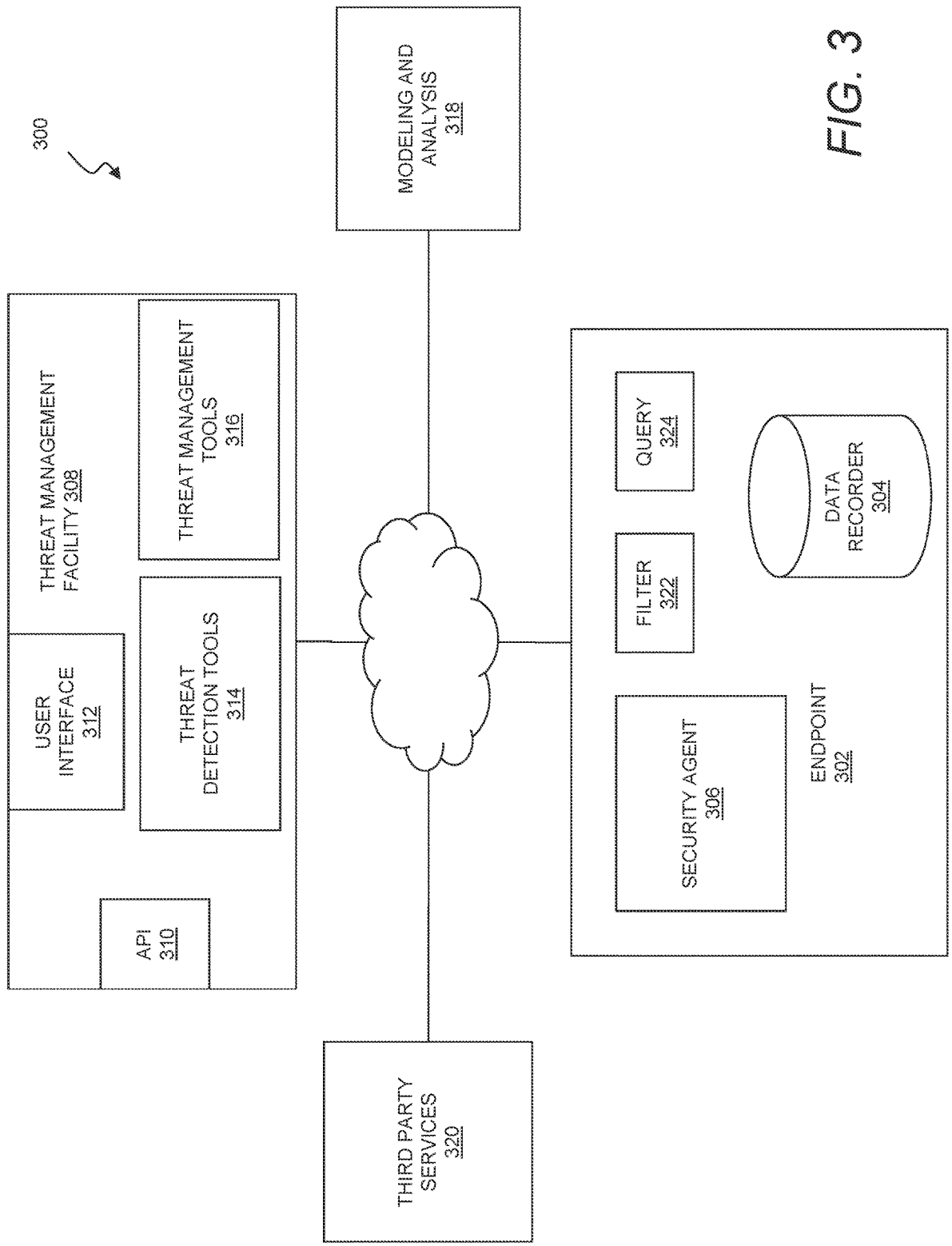
FIG. 3 shows a system for enterprise network threat detection.

FIG. 3 shows a system 300 for enterprise network threat detection. The system 300 may use any of the various tools and techniques for threat management contemplated herein. In the system, a number of endpoints such as the endpoint 302 may log events in a data recorder 304. A local agent on the endpoint 302 such as the security agent 306 may filter this data and feeds a filtered data stream to a threat management facility 308 such as a central threat management facility or any of the other threat management facilities described herein. The threat management facility 308 can locally or globally tune filtering by local agents based on the current data stream, and can query local event data recorders for additional information where necessary or helpful in threat detection or forensic analysis. The threat management facility 308 may also or instead store and deploys a number of security tools such as a web-based user interface that is supported by machine learning models to aid in the identification and assessment of potential threats by a human user. This may, for example, include machine learning analysis of new code samples, models to provide human-readable context for evaluating potential threats, and any of the other tools or techniques described herein. More generally, the threat management facility 308 may provide any of a variety of threat management tools 316 to aid in the detection, evaluation, and remediation of threats or potential threats.

The threat management facility 308 may perform a range of threat management functions such as any of those described herein. The threat management facility 308 may generally include an application programming interface 310 to third party services 320, a user interface 312 for access to threat management and network administration functions, and a number of threat detection tools 314.

In general, the application programming interface 310 may support programmatic connections with third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a website or other graphical interface or the like, and may generally provide an interface for user interaction with the threat management facility 308, e.g., for threat detection, network administration, audit, configuration and so forth. This user interface 312 may generally facilitate human curation of intermediate threats as contemplated herein, e.g., by presenting intermediate threats along with other supplemental information, and providing controls for user to dispose of such intermediate threats as desired, e.g., by permitting execution or access, by denying execution or access, or by engaging in remedial measures such as sandboxing, quarantining, vaccinating, and so forth.

The threat detection tools 314 may be any of the threat detection tools, algorithms, techniques or the like described herein, or any other tools or the like useful for detecting threats or potential threats within an enterprise network. This may, for example, include signature based tools, behavioral tools, machine learning models, and so forth. In general, the threat detection tools 314 may use event data provided by endpoints within the enterprise network, as well as any other available context such as network activity, heartbeats, and so forth to detect malicious software or potentially unsafe conditions for a network or endpoints connected to the network. In one aspect, the threat detection tools 314 may usefully integrate event data from a number of endpoints (including, e.g., network components such as gateways, routers and firewalls) for improved threat detection in the context of complex or distributed threats. The threat detection tools 314 may also or instead include tools for reporting to a separate modeling and analysis platform 318, e.g., to support further investigation of security issues, creation or refinement of threat detection models or algorithms, review and analysis of security breaches and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances or the like described herein. This may, for example, include end-user computing devices, mobile devices, firewalls, gateways, servers, routers and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g., models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network and the like. The level of reporting may also or instead be based on currently available network and computing resources, or any other appropriate context.

In another aspect, the endpoint 302 may include a query interface 324 so that remote resources such as the threat management facility 308 can query the data recorder 304 remotely for additional information. This may include a request for specific events, activity for specific computing objects, or events over a specific time frame, or some combination of these. Thus, for example, the threat management facility 308 may request all changes to the registry of system information for the past forty eight hours, all files opened by system processes in the past day, all network connections or network communications within the past hour, or any other parametrized request for activities monitored by the data recorder 304. In another aspect, the entire data log, or the entire log over some predetermined window of time, may be request for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. The threat management facility may be configured to receive the filtered event stream from the endpoint, detect malware on the endpoint based on the filtered event stream, and remediate the endpoint when malware is detected, the threat management facility further configured to modify security functions within the enterprise network based on a security state of the endpoint.

The threat management facility may be configured to adjust reporting of event data through the filter in response to a change in the filtered event stream received from the endpoint. The threat management facility may be configured to adjust reporting of event data through the filter when the filtered event stream indicates a compromised security state of the endpoint. The threat management facility may be configured to adjust reporting of event data from one or more other endpoints in response to a change in the filtered event stream received from the endpoint. The threat management facility may be configured to adjust reporting of event data through the filter when the filtered event stream indicates a compromised security state of the endpoint. The threat management facility may be configured to request additional data from the data recorder when the filtered event stream indicates a compromised security state of the endpoint. The threat management facility may be configured to request additional data from the data recorder when a security agent of the endpoint reports a security compromise independently from the filtered event stream. The threat management facility may be configured to adjust handling of network traffic at a gateway to the enterprise network in response to a predetermined change in the filtered event stream. The threat management facility may include a machine learning model for identifying potentially malicious activity on the endpoint based on the filtered event stream. The threat management facility may be configured to detect potentially malicious activity based on a plurality of filtered event streams from a plurality of endpoints. The threat management facility may be configured to detect malware on the endpoint based on the filtered event stream and additional context for the endpoint.

The data recorder may record one or more events from a kernel driver. The data recorder may record at least one change to a registry of system settings for the endpoint. The endpoints may include a server, a firewall for the enterprise network, a gateway for the enterprise network, or any combination of these. The endpoint may be coupled to the enterprise network through a virtual private network or a wireless network. The endpoint may be configured to periodically transmit a snapshot of aggregated, unfiltered data from the data recorder to the threat management facility for remote storage. The data recorder may be configured to delete records in the data recorder corresponding to the snapshot in order to free memory on the endpoint for additional recording.

Figure 4:
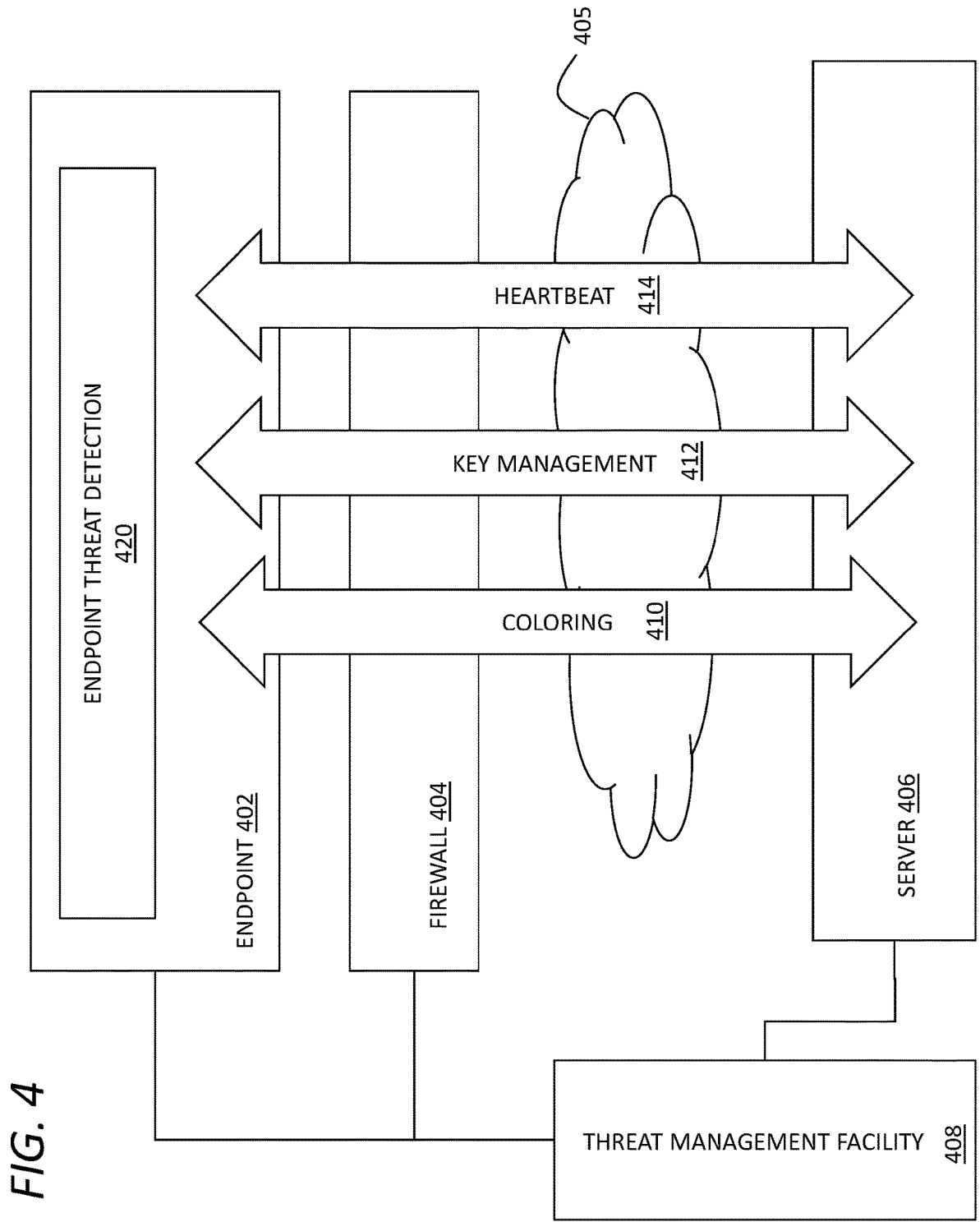
FIG. 4 illustrates a threat management system.

FIG. 4 illustrates a threat management system. In general, the system may include an endpoint 402, a firewall 404, a server 406 and a threat management facility 408 coupled to one another directly or indirectly through a data network 405, all as generally described above. Each of the entities depicted in FIG. 4 may, for example, be implemented on one or more computing devices such as the computing device described herein. A number of systems may be distributed across these various components to support threat detection, such as a coloring system 410, a key management system 412 and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 410 as contemplated herein.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected. Thus, for example, if a particular process executing on the endpoint is compromised, or potentially compromised or otherwise under suspicion, keys to that process may be revoked in order to prevent, e.g., data leakage or other malicious activity.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 408 to the threat management facility 408) or bidirectionally (e.g., between the endpoint 402 and the server 406, or any other pair of system components) on any useful schedule.

In general, these various monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted or otherwise modified. More generally, the cooperation of these systems enables a wide variety of reactive measures that can improve detection and remediation of potential threats to an endpoint.

Figure 5:
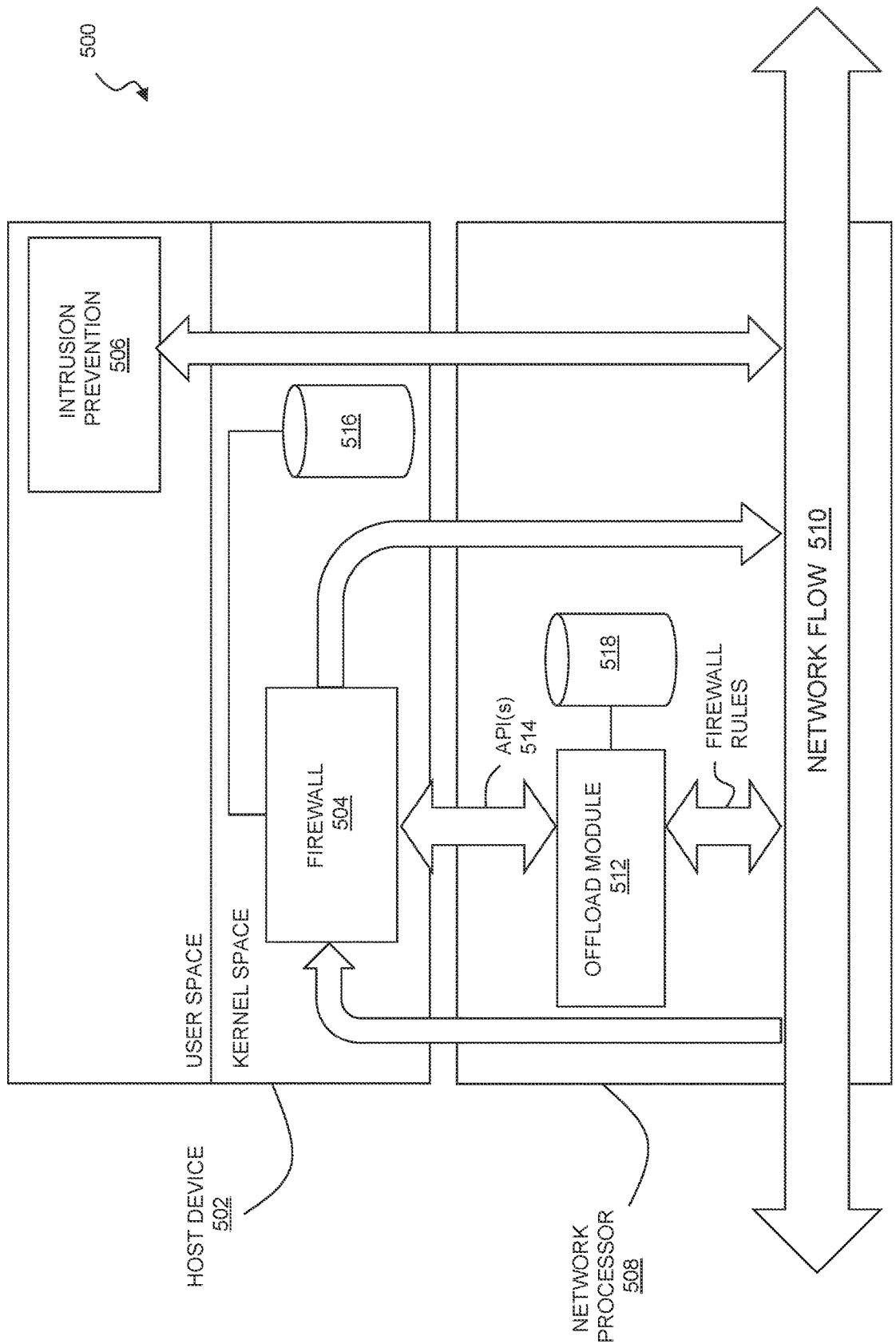
FIG. 5 shows a firewall system.

FIG. 5 shows a firewall system. In general, the system 500 may include a host device 502 having a firewall 504 executing in a kernel space and an intrusion prevention system 506 executing in a user space. A network processor 508 may connect network flows 510 including network packets or the like between a source and a destination. An offload module 512 may execute on the network processor, and may communicate with the firewall 504 through one or more application programming interfaces (indicated generally by an arrow 514) so that the firewall 504 can redirect network flows 510 to the network processor 508 and, when appropriate, the offload module can return network flows 510 to the firewall 504. The host 502 may include a memory 516 storing one or more firewall rules used by the firewall 504 in determining a firewall action for the network flows 510. The network processor 508 may include a memory 518 with a lookup table storing a list of one or more network flow connections directed through the offload module 512 by the firewall 504. In this context, it will be understood that, while the network flows 510 are described as passing "through" the firewall 504 or the offload module 512, it is not necessary that each physical packet of data passes through either of these processes or modules as depicted in FIG. 5. Rather, it should be understood more generally that either the firewall 504 or the offload module 512 will be responsible for each network flow associated with each connection passing through the network processor 508, or, as described in alternative embodiments below that do not uses a network processor 508, through a virtual fast path hosted in the kernel space of the host device 502.

In general, the offload module 512 may be configured as described herein to receive firewall rules from the firewall 504, and to deploy these firewall rules on the network flow 510 in a manner that cooperates with or bypasses the firewall 504. In one aspect, the offload module 512 may be deployed on separate hardware as described above to reduce processing burdens on the host device 502. In another aspect, the offload module 512 may include a kernel space process or other process on the firewall 504. The offload module 512 may also or instead be distributed between the host device 502 and external hardware (such as the network processor), and/or some other computing devices suitable for supporting handling of the network flow 510 according to firewall rules as described herein.

The host device 502 may also include an intrusion prevention system 506 executing in the user space and generally configured to detect potential threats in the network flow 510, e.g., using any of the malware or intrusion prevention techniques described herein, or otherwise known in the art. For example, the intrusion prevention system 506 may perform antivirus scanning, web traffic filtering, secure socket layer inspection, or any other security scans or analysis applicable to network traffic, including techniques using packet coloring as described herein.

In general, the firewall 504 may apply firewall rules, e.g., according to a security policy for an enterprise network, to connections within the network flow 510, such as each new incoming connection or other connection created or existing within the network flows. For example, the firewall 504 may receive firewall rules or related security information from a threat management facility such as any of the threat management facilities described herein, which may manage the firewall rules to add, remove, or modify firewall rules according to a current or anticipated threat environment. A firewall rule may be associated with one or more firewall actions. Once a particular firewall action has been identified (e.g., based on a threat environment, network connection, source and destination, and the like) for a connection, the firewall action may be communicated to the offload module 512 for use in managing one or more of the network flows 510 independently from the firewall 504. When a network flow 510 appears invalid (e.g., based on the information communicated to the offload module 512) or is absent from the lookup table, or if the network flow 510 is identified as potentially malicious by the intrusion prevention system 506, the offload module 512 may redirect the corresponding connection back to the firewall 504 for further processing.

The connection lookup table may identify each of one or more connections within the network flow(s) 510 using any suitable connection identifiers such as one or more of an Internet Protocol source and destination address, a layer 4 source and destination address, a Medium Access Controller source and destination address, and a protocol identifier. Once the firewall 504 has analyzed a network flow 510 for compliance with firewall rules, the firewall 504 may identify a corresponding connection (or connections) using these identifiers, which may be transmitted to the offload module 512 for storage in the lookup table and for use in identifying and managing individual network flows 510. In addition to identifying a connection in this manner, the firewall 504 may communicate the corresponding firewall action (e.g., selecting security processing for a network flow, redirecting a network flow, or dropping a network flow) to the offload module 512 for storage in the lookup table and for use by the offload module 512 in managing network flows 510.

Figure 6:
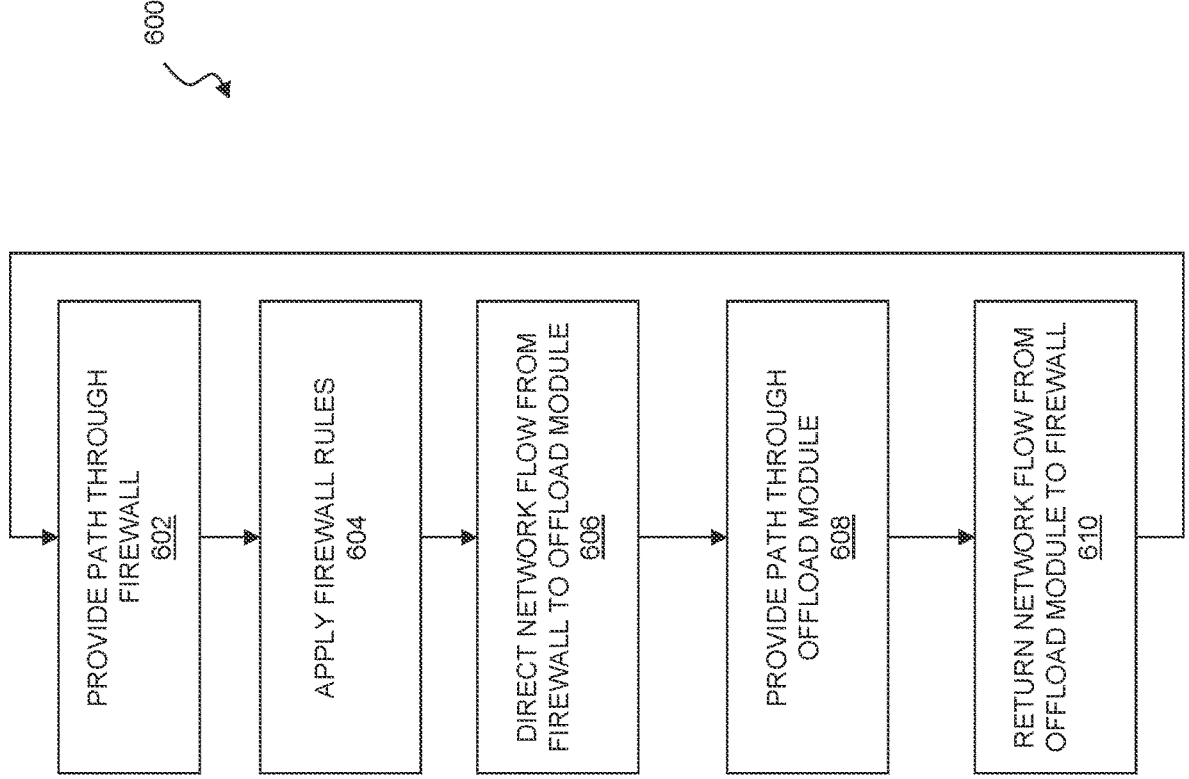
FIG. 6 shows a method for operating a firewall system.

FIG. 6 shows a method for operating a firewall system. The method 600 may generally include providing a first path for network traffic through a firewall on a host device as shown in step 602 and providing a second path for network traffic through an offload module as shown in step 608, where the second path is separate from the first path. It will be understood that although these paths are illustrated as being provided sequentially, in general, both of these paths remain continuously available for network traffic, and which of the paths is assigned to a particular network flow may depend on the current status of the network flow, among other factors.

Thus, in one aspect, the method 600 may include directing a network flow including one or more packets along the first path to the firewall and applying one or more firewall rules as shown in step 604. In response to determining with the firewall that the network flow is permitted by the one or more firewall rules, the method may include communicating an instruction from the firewall to the offload module for the offload module to handle packets for the network flow, thereby directing the network flow from the firewall to the offload module.

As shown in step 610, while the network flow is directed through the offload module (or more generally, the network processing unit or other virtual path outside the firewall), the method may include determining with the offload module that the network flow handled by the offload module is not valid, invalidating a state stored by the offload module as corresponding to the network flow, and returning the network flow to the firewall. In one aspect, the offload module may include a kernel space process executing on the host device for the firewall. Thus, the host may provide a virtual path for network connections that offloads firewall processing as described herein without requiring separate network processing hardware. In another aspect, the offload module includes a process executing on a network processing unit for the network traffic. Invalidating the state may include invalidating one connection handled by the offload module, a group of level three connections handled by the offload module, or all connections handled by the offload module.

Although not illustrated in FIG. 6, it will be understood that an intrusion prevention system may analyze a network flow independently from the firewall and the offload module. In response to determining with an intrusion prevention system, such as one executing in a user space on the host device, that the network flow handled by the offload module presents a security risk, the method 600 may include remediating the network flow. For example, remediating the network flow includes returning the network flow to the firewall. Remediating the network flow may also or instead include disconnecting the network flow. Remediating the network flow may also or instead include remediating a source or a destination of the network flow.

In another aspect, the method may include providing a first path for network traffic through a firewall on a host device, providing a second path for network traffic through an offload module, the second path separate from the first path, and switching a network flow between the first path and the second path based on one or more of a group of firewall rules, a group of intrusion prevention rules, and a group of packet validity rules. The network flow may include one or more packets, the group of firewall rules may cause a transition of the network flow from the first path to the second path. The group of intrusion prevention rules may cause a transition of the network flow from the second path to the first path. The group of packet validity rules may cause a transition of the network flow from the second path to the first path.

Additional details of firewall offloading methods and systems are now provided. In one aspect, the system may generally support firewall offload from a host Linux system to a Network Processor Unit (NPU). In this context, the system may cache and offload network security and forwarding operations from a Linux networking stack to an offload module that can subsequently perform them while making end-to-end behavior transparent to the networking stack. In one aspect, the offload module may be an optimized or computationally efficient software implementation executing on the host device. In another aspect, the offload module may include additional hardware such as a special-purpose network processor capable of applying the operations at high traffic rates and low latency. The system may also support high-speed bypass of the networking stack through user-space security functions such as IPS, Web filtering, SSL inspection or AV scanning.

The platform may include, for example, a commercial off-the-shelf networking stack (i.e., Linux) capable of applying forwarding and security decisions statefully at a connection-oriented level, a set of abstract cached mappings of traffic to operations ("flow cache"), a mirror copy of networking stack state which the offload module synchronizes with the network stack, mechanisms in the networking stack to select traffic that can reliably be mapped to operations, an interface (API) for programming and querying flow cache and the mirrored networking state in the offload module and to invalidate and/or update that cached state with that of the networking stack, an interface (API) for the offload module to deliver traffic that misses the flow cache to the networking stack, a high-speed RPC mechanism to implement API operations to hardware offload module implementations without unduly delaying packet processing (see RPC patent proposal), a high throughput transport for packets to and from user-space security applications, and a per-connection state table ("Unified Session Table") that augments the network connection state with security state to allow security applications access to security-relevant information at the latency of memory access.

As a significant advantage, this architecture can augment commercial off-the-shelf networking stacks to support hardware and/or software acceleration of the firewall as well as network stack bypass to inline security functions. The acceleration may generally lower cost and improve performance, while the network stack bypass advantageously facilitates scalable addition of inline security functions without bottlenecking performance in the networking stack.

The remainder of this disclosure refers to the host Linux networking stack as Path 1 (the SP) and the offload module as Path 2 (the FP). If the FP is a kernel module in the host system itself, it is referred to as the Virtual FP (VFP) while the offload module that resides on a separate Network Processing Unit (NPU) is referred to as XFP.

Path 1 (SP) may process the initial packets of a new flow, populating the Linux conntrack table as these initial packets pass through all the netfilter/iptables hooks registered in the host system. Once the SP makes a firewall decision for a particular flow, it can then offload that flow to Path 2 (FP) based on the firewall state for that flow in the host Linux kernel by programming the FP using a well-defined Path 2 Programming API. The firewall state cached on the FP is essentially a bidirectional flow cache based on the digested version of the firewall and forwarding state that is available on the SP.

The FP Programming API may define a common interface to the SP to update and query the forwarding state in the FP module as well as an interface for the FP to update SP firewall state. The FP API may provide two groups of API functions. The first group, Path 1 to Path 2 (SP2FP) API allows the SP to update and query the firewall state on the FP. The second group, Path 2 to Path 1 (FP2SP) API, on the other hand allows the FP to update relevant state information on the Linux kernel, namely per port and connection traffic statistics.

The SP may use the SP2FP API from three different contexts: (1) During system initialization to program the initial FP state including a FP representation of all the network ports in the system as well as relevant state for direct packet delivery mechanism to the host system userspace (whether it is via DPDK in case of XFP or netmap in case of VFP); (2) Through various points in the packet-processing context in the Linux network stack when the SP decides to offload a flow to the FP or discovers new L2 neighbors or L3 routes; and (3) As a response to changes in the overall system such as configuration changes that can impact firewall state (firewall rules added, modified, deleted, interface configuration changes etc.) or changes in the dynamic firewall state (updates to the routing table, neighbor table, users logging in and out, etc.).

The FP offload module may use the FP2SP API functions to: (1) Update per port and per connection traffic statistics in the host system Linux kernel; and (2) Hand terminating connections in bulk to the host system Linux kernel.

The architecture may generally keep the interaction between SP and FP agnostic to the type of the FP that is running with a well-defined FP API as described earlier. The SP may effectively call same API in the same manner whether the FP is VFP or XFP, with the API hiding the different mechanisms that are in place to access or update the FP state from the SP. In case of VFP, the API may access the FP state through a direct memory read/write while XFP utilizes a high-speed, PCIe based Remote Procedure Call (RPC) mechanism to access memory on the NPU. In case of XFP, the requests issued by the FP offload module may issue requests to invoke FP2SP API functions on the host system through the use of well-defined control messages sent from the NPU to the host system via a PCIe based control message channel that is established between the FP and SP. A Control Message Handler (CMH) on the host may listen to these control messages from the FP and multiplex the FP requests to the SP by calling the appropriate FP2SP API function.

Architecturally, a host device as described herein may include: (1) Path 1 (SP) using a Linux kernel networking stack, conntrack, iptables, netfilter, etc.; (2) an FP API module using a Linux kernel module that implements the FP API (SP2FP and FP2SP); (3) one or more instances of Intrusion Prevention System (IPS) or other software applications running in userspace; and (4) a Unified Session Table—A per-connection state table that augments the network connection state in the host Linux kernel with security state to allow security applications running in userspace to access security-relevant information at the latency of mapped memory access. In case of XFP, the host device may further include: (1) a Remote Procedure Call (RPC) module that allows for a high performance and scalable access to the NPU memory for use by the FP API implementation; and (2) a Control Message Handler (CMH) that processes control messages from XFP for bulk connection traffic statistics and connection termination indications that will invoke relevant FP2SP API functions to update conntrack table state in the host Linux kernel or to hand connections over. In the case of VFP, a Linux kernel FP module that offloads firewall, routing and forwarding logic from the Linux networking stack In case of XFP, the following system components are present on a Network Processing Unit (NPU): (1) an RPC request handler running in the NPU kernel; (2) an FP API request handler running in the NPU kernel; (3) a Path 2 module including a packet processing module that runs on the NPU userspace that offloads packet processing on the host kernel to free up processing cycles for other code running on host processor The system may maintain a number of tables to facilitate management of traffic offloading. There are a number of different types of tables that may be present in the FP for offloading traffic that the SP programs using the SPP2FP API and the FP offload module consults as it processes packets.

Logical Interface Table

A logical interface (LIF) table may determine the incoming interface of a given packet. It maps a physical input port along with possibly a VLAN tag (if present in the packet) to a logical interface. Each entry in the LIF table contains information including forwarding mode of the LIF which determines whether the FP should treat packets received over this LIF in bridge or routing mode, L2 address (MAC) of the corresponding port and the MTU.

Microflow Table

A Microflow table may provide a flow cache that allows the FP offload module to associate a received packet to a flow. In addition to the traditional 5-tuple connection key, i.e., layer 3 (IPv4 or IPv6) source and destination address, layer 4 protocol identifier, L4 source and destination port, the flow key also contains ingress LIF identifier, Ethernet type, source and destination MAC address in the packet received. A microflow entry essentially reflects the cached version of the firewall decision and actions that are associated with a flow as determined by the initial processing of the first few packets by the SP. Once Path 1 decides to offload a flow, it programs a connection entry and microflow entries (one per direction) with information that allows the FP to disposition the packet including: (1) Action for packet disposition, i.e., whether to send it out to a port or to a security application such as IPS, Web filtering, SSL inspection or AV scanning that resides on the host userspace, and (2) Indices to access the corresponding FP connection and NHOP entry for connection tracking and forwarding information. If there is no usable microflow entry for a packet received, FP adds a new microflow entry in the table, marks it as "incomplete" and sends the packet to host Linux kernel SP for processing. When the SP decides to offload the corresponding flow at some point (in the context of processing a packet), it uses the SP2FP API to complete the programming of this microflow entry and programs a corresponding Path 2 connection entry (as described in the next table).

Connection Tracking Table

A connection tracking table may store state information associated with each bi-directional, 5-tuple based connection in the system. The most common use for this information is to store TCP sequence and state information in order to perform proper TCP connection tracking as well as source and destination NAT. This is required for stateful firewall semantics.

While the XFP maintains a separate table for connection tracking purposes, the VFP on the other hand may dispense with this table because the VFP resides in the host Linux kernel and can access the Linux conntrack table for all connection tracking purposes. The SP programs an entry in this table at the time it decides to offload a flow.

Data stored per connection entry in the FP includes the following (Note in case VFP, there is no separate connection table and the following data is part of the SP Linux kernel conntrack entry):

Connection state
  In case of a TCP connection:
    TCP sequence info per direction
    Packet retransmit counter (for maximum packet retransmit tracking)
    FIN tracking information in case connection termination on the FP is enabled for bulk connection handover optimization
Source and Destination NAT configuration
IPS verdict (cut-thru or drop)
PCIe VF identifier that connects to the IPS instance
Connection traffic stats The SP may manage the connection timeouts for all connections including offloaded ones. For the existing timeout mechanism in the SP to work properly for connections offloaded to the FP, there is a need to keep the timestamp and the traffic stats in the host Linux kernel conntrack track up to date. For the VFP case, the FP updates the host Linux kernel conntrack directly using a function call to the appropriate FP2SP API function. For the XFP case, the FP offload module sends periodic batch updates in a control message containing traffic statistics for the offloaded connections. There is a control message handler in the host system that listens to such control messages to update the Linux kernel conntrack entry and set the entry timestamp to the current time using the appropriate FP2SP API function. A benefit of keeping the connection traffic statistics on the host Linux kernel conntrack is that this allows all the Linux based conntrack tools to be available to the user for debugging.

NHOP Table

An NHOP table is programmed with each L3 router or L2 neighbor on a given port. A NHOP entry essentially is a digested version of the forwarding information in the SP. L3 NHOP entries are for routed traffic while L2 entries are for bridged traffic. In case of L3, in addition to the outgoing port information, the NHOP entry also stores the source and destination MAC address that the offload module will overwrite before sending the packet out. The FP offload module consults this table as the last step using the NHOP index stored in the microflow entry. The SP programs or updates entries in the NHOP table from appropriate points in the Linux networking stack when it discovers new L2 or L3 neighbors.

At a high level, packets that match an offloaded flow with fully programmed firewall state on the FP may completely bypass the SP on the host and get directed either out to a network port or delivered directly to one of possibly multiple instances of Intrusion Prevention System (IPS) software application running in the host userspace. The FP may deploy an appropriate direct delivery mechanism to deliver packets to the host userspace efficiently, whether it is netmap in the VFP or DPDK in the XFP case. When packets do not match an offloaded flow or a flow with incomplete firewall state, FP may send them to the SP using a well-defined packet API. This API allows the FP offload module to insert relevant meta-data to the start of the packet for use by the driver on the host to associate the packet with the Linux netdev that corresponds to the port on which NPU received the packet.

When the system receives a packet from a network port on the NPU, the FP offload module processes it first. The FP offload module may perform various validity checks on the L2, L3 and L4 headers in the packet. If any of these checks fail or if the packet corresponds to a type of traffic that does not qualify for offload such as broadcast or multicast traffic, the FP offload module sends the packet to the host system for processing by the firewall.

If the traffic qualifies for offload, using the ingress port ID and optionally the VLAN ID (if present in the packet), the FP offload module looks up the LIF table. If the lookup does not return a valid LIF entry, FP offload module drops the packet. If there is a valid LIF entry but offload is disabled (on that particular LIF or for all LIFs), the FP offload module sends the packet to the host system, inserting a meta-data before the packet that will allow the network driver on the host system to associate the packet with the Linux netdev that corresponds to the ingress port.

If there is a valid LIF and offload is on, the FP offload module looks up the Microflow table next. The first time FP offload module sees a packet for a new flow; it inserts a "pending" microflow entry into the table and sends the packet to the host system. This time, in addition to the metadata that identifies the received port, the offload module inserts another metadata, a microflow ID to indicate to the SP that the flow that corresponds to this packet is a candidate for offload. The SP programs microflow entries using a kernel hook inserted towards the end of the Linux network stack packet processing. The SP will offload a flow when it meets the following criteria:

The flow is an offload candidate—FP offload module indicates this to the SP on the host system by passing a microflow ID as metadata along with the packet. The offload module will only indicate candidate offload flows if the traffic type is supported for offload.
  All the firewall/forwarding decisions for the packet have been made by the Linux network stack (IPS, L2/L3 forwarding, NAT etc.)
  The conntrack entry related to the flow is in established state
  The flow is between NPU ports
  The flow's NHOP is resolved if this is an L3 flow
  The flow is not destined to a local address, in other words connection is not terminated locally
  The connection table on the FP is not full When the conditions above are met, the SP will program the corresponding connection and microflow entry in the FP, using the appropriate state in the Linux kernel, including state in the iptables, netfilter, conntrack, and bridge and routing tables to offload the flow to the FP. Once offloaded, if for any reason SP receives a packet that matches that flow, the SP has to consult the FP for validity of the connection state as well as TCP sequence state for TCP flows using the SP2FP API. The SP also programs the UST entry corresponding to the connection to indicate the flow's offloaded status. This enables any host processing modules such as IPS to know that they can inject or transmit traffic for the same traffic directly to Path 2.

The FP offload module will continue sending packets to the host system as long as it matches a 'pending' microflow entry. Once the microflow is programmed, the FP offload module lookup will yield an 'active' microflow entry which contains information that the FP offload module uses to determine how to disposition the packet as well as an index to the corresponding connection entry.

Using this index, the offload module loads the connection entry. If the packet is a TCP packet, it performs connection tracking (sequence checking and maximum retransmit tracking) using the state in the connection entry. If TCP sequence checking fails, the offload module sends the packet to the host system for the Linux network stack to process it. If the connection entry indicates an IPS verdict to drop (as a result of earlier packet inspection that was performed by the IPS module), the offload module drops the packet without any further processing.

Based on the action indicated in the microflow entry, the offload module can direct the packet to:
  Another network port (FWD Action)
  To an IPS instance running on the host system userspace before forwarding (IPS Action)
  Drop the packet (DROP Action)

If the connection entry indicates that NAT should be performed for a packet, the offload module will modify the contents of the packet to possibly overwrite IP source/destination address, L4 source/destination port depending on whether DNAT and/or SNAT is to be performed. In case the microflow action is to send the packet to IPS, offload applies DNAT to the packet, recomputing L3 and L4 checksums in the headers before it sends the packet to IPS. SNAT on the other hand is applied to the packet before it is sent out on the network (and after it is received from IPS if it had been sent to IPS earlier). If the microflow action is "IPS", the offload module retrieves the PCIe VF information to reach the appropriate IPS in the host system from the connection entry. Before sending the packet to the IPS, the FP offload module caches the ID of the microflow in a meta-data at the start of the packet. After the packet inspection and if IPS decides to let the packet through, IPS retains the metadata cached when it sends the packet back to FP. This way, the offload module can efficiently use the previous lookup results for continuing the packet journey. At some point during the inspection process performed by the IPS module, it can reach a verdict that may be to drop or bypass inspection (i.e., cut-through verdict) for all subsequent packets corresponding to the flow. When that happens, the IPS module updates the universal session table entry corresponding connection entry in the host system Linux conntrack. This then results in an SP2FP API call to the FP that will in turn update the IPS verdict stored in the FP connection entry.

Whether the offload module sent the packet to IPS earlier or not, if the packet needs to go out to the network, the offload module may consult the NHOP table. Using the NHOP identifier cached in the microflow entry, the FP offload module may access the NHOP table entry to retrieve the outgoing port information. Additionally, in case the NHOP is an L3 NHOP, the offload module may overwrite the source and destination MAC addresses in the packet with those cached in the NHOP entry, decrement the TTL value in the IP header and re-compute IP header checksum. This is also the stage when the offload module would apply SNAT to the packet if the connection entry dictates so, potentially updating the L4 header with a different source port value and requiring a layer checksum re-computation. Once the offload module makes all the necessary modifications to the packet, it can send the packet out on the port indicated in the NHOP entry.

The FP module may also support packet injection by the IPS module. For packets IPS module injects to the network, the module may insert meta-data with corresponding identifiers to allow the FP module to lookup information for processing and sending the injected packet out though an NPU interface.

When the FP offload module detects a TCP connection termination, it marks the corresponding connection entry as 'reclaim pending' and sends any further packet received for that flow to the host system for the SP to process the connection termination. As part of the connection termination, the SP may call an SP2FP API that returns all the cached connection tracking state including TCP sequence state used for the handover of the connection from FP to SP. In order to avoid an API call for each terminating connection, the FP offload module may also implement a 'bulk' connection reclaim method. In this case, the offload module on the FP processes the connection terminations (FIN tracking) and periodically sends a batch of connection termination requests to the CMH on the host system.

Figure 7:
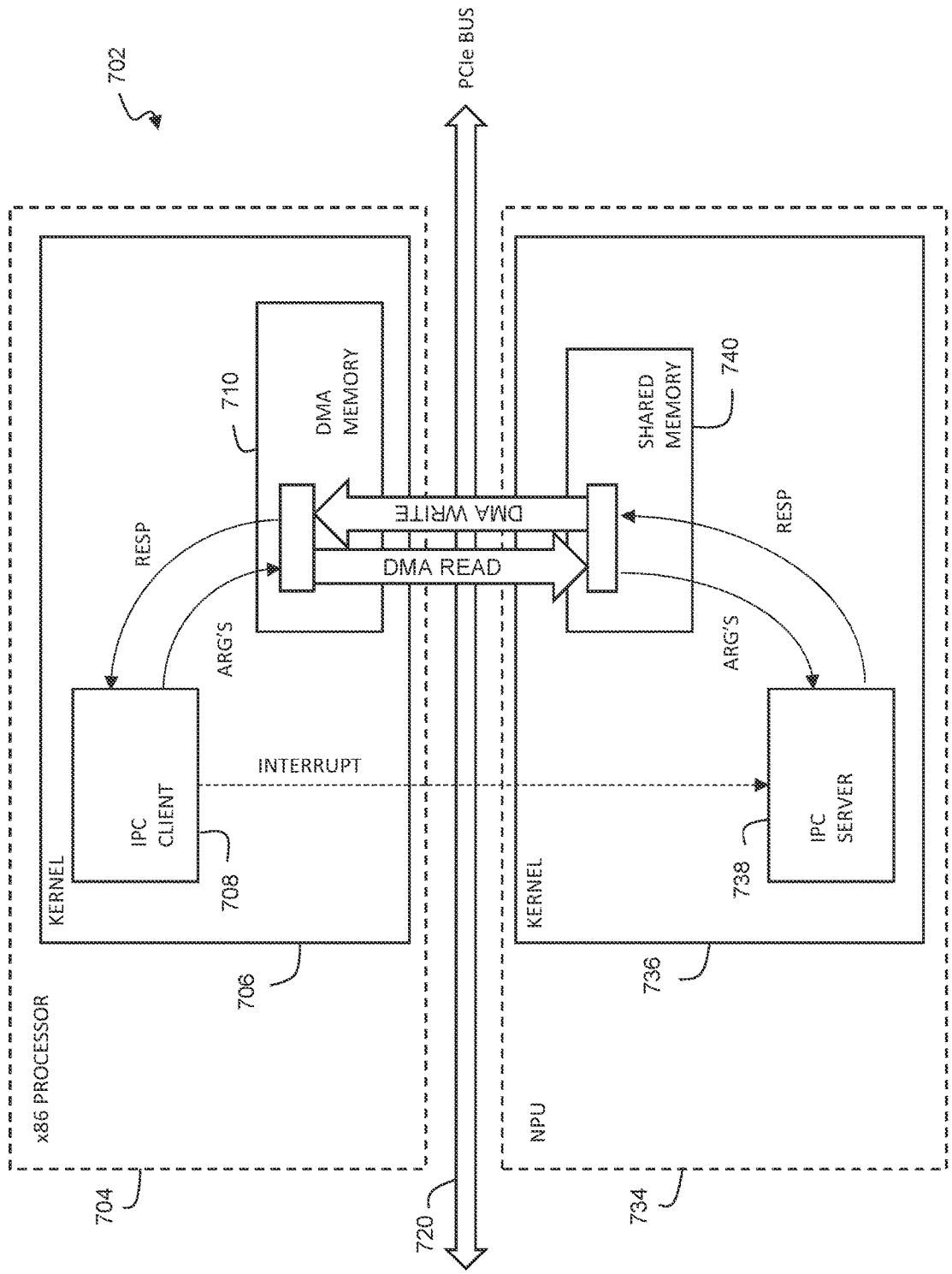
FIG. 7 shows an architecture for a firewall.

FIG. 7 shows an architecture for a firewall. In general, the firewall 702 may be any of the firewalls described herein, and may have an architecture for offloading certain traffic management functions and/or network flows to a network processing unit or the like associated with the firewall 702. The firewall 702 may be hosted on a first processor 704 such as an x86 architecture processer, which may include a kernel space 706 hosting a client 708 that uses a first memory 710 to exchange messages with another processor. The firewall 702 may be coupled through a local bus 720 such as a PCIe bus or any other suitable local hardware bus to a second processor 734 such as a network processing unit with a second kernel space 736 hosting a server 738 that uses a second memory 740 to exchange data with the first memory 710 of the first processor 704 so that the second processor 734 can host procedures that support operation of the first processor 704. It will be understood that, while the following describes the use of such interprocessor procedure calls to support operation of a firewall 702 that offloads certain traffic handling operations to a network processing unit, such as the firewalls described herein, these techniques may more generally be used in any context where distributed processing is performed, e.g., where network processes or other procedures or the like are offloaded from one processor to another processor coupled through a local hardware bus.

As generally illustrated in FIG. 7, arguments for an interprocessor procedure call may be provided by the client 708 to the first memory 710 of the first processor 704, which may, for example, include direct memory access (DMA) memory or any other memory configuration suitable for permitting remote access to memory of the first processor 704. This data may be exchanged with an external resource such as the network processing unit 734 via a direct memory access read and write to the second memory 740, or any other technique suitable for sharing data between the two memories 710, 740. In general, after a DMA read or similar operation to transfer procedure arguments to the second memory 740, the client 708 may send an interrupt to the server 738 that hosts the remote procedure, and the server 738 may process the procedure call based on data in the second memory 740. Results of the procedure may then be returned to the first memory 710 via a DMA write or any other suitable operation, and the client 708 may periodically poll a corresponding local memory location, e.g., in the first memory 710, for results of the procedure executed by the server 738 on the second processor 734.

This distributed approach to processing advantageously permits scalable execution and parallelization of data transport and execution for different network flows. While existing techniques for remote procedure calls typically operate on distributed systems accessible via layer 4 communication protocols, the techniques described herein mitigate the latency involved with such communications that might otherwise diminish the performance of or outright prevent inline network offloading applications. More specifically, the advantages to the techniques described herein include the creation of a low latency interface between an x86 processor and a locally coupled network processing unit, the ability to execute procedure calls between processors inline within the packet processing context in the x86 kernel, and a scalable execution model the supports parallel execution of separate network flows. Additionally, the techniques described herein provide an asynchronous interface for procedures that do not require any response. That is, callers of the remote procedure may advantageously elect to execute either a synchronous blocking or asynchronous non-blocking procedure call without any reconfiguration of the transport mechanism.

In general, the protocol between the client 708 and the server 738 is implemented as a multi-producer, single-consumer ring. The calling mechanism may make use of a shared memory location, located on the NPU local memory and accessible via the PCIe Base Address Register (BAR) from the x86. This shared memory location may contain the general procedure call state, along with the individual ring state, e.g., a configuration state, producer/consumer indices, and message descriptors. Whenever the client 708 adds a new message to the ring, the client 708 may populate a descriptor for the entry and then the hardware for the server 738 can be signaled that a new message is available for processing via an interrupt. For hardware without interrupt capabilities, the server may execute a server thread that can poll the ring state and/or status instead. This calling mechanism can be scaled for performance by adding more server threads. There may be separate rings provided for each independent handler thread and another separate ring provided for low priority procedure calls. Each server 738 or server thread may operate independently.

Figure 8:
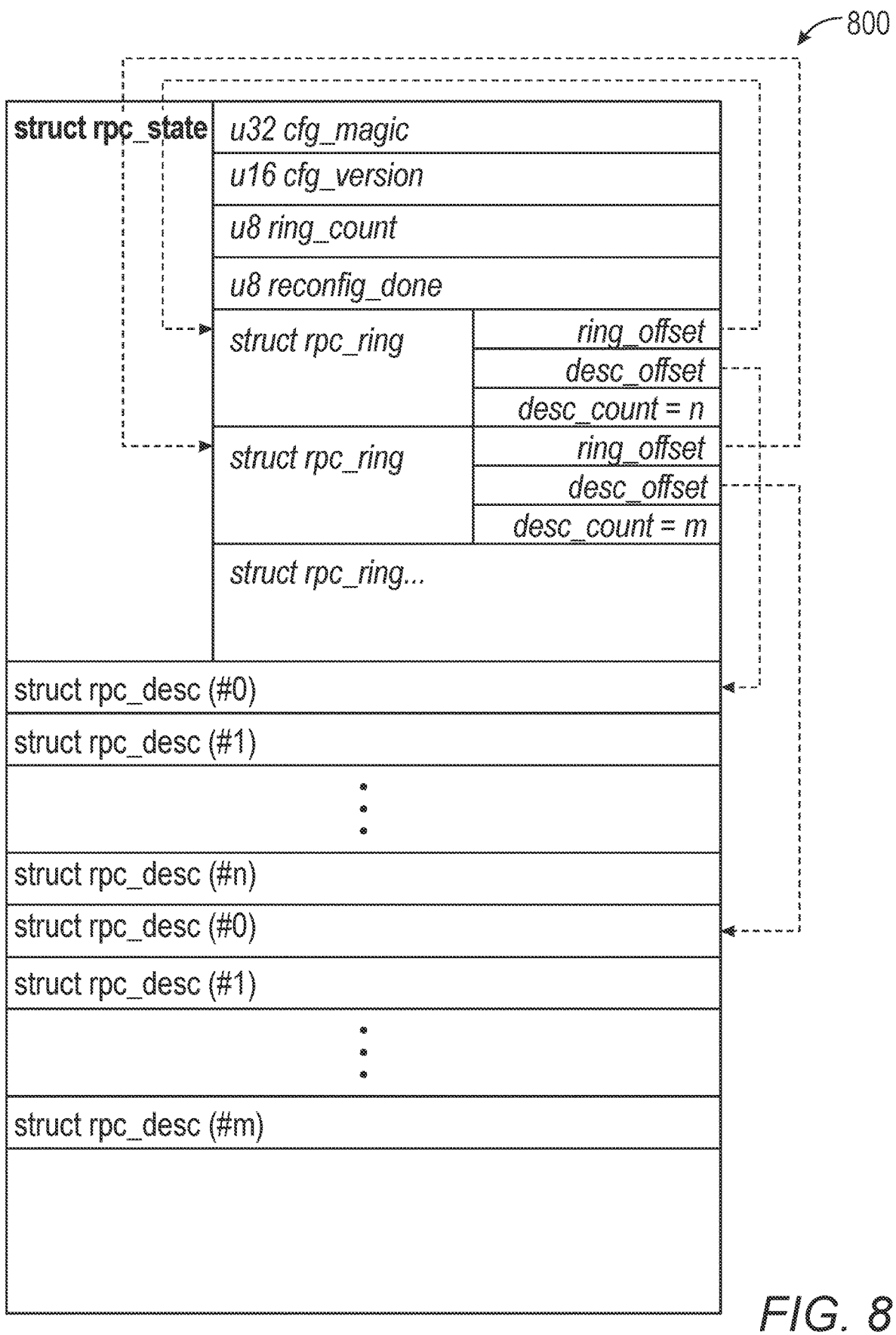
FIG. 8 illustrates interprocessor procedure calls stored in a shared memory.

FIG. 8 illustrates interprocessor procedure calls stored in a shared memory. Initially, a client 708 initializes the client threads by configuring the procedure call state and incrementing the configuration version field. This data may be stored in the shared memory location using a structure illustrated in the figure. Each message passed by the client 708 will contain some metadata contained in a descriptor structure (cmd_bar_desc). This metadata will contain the pointer to the x86 memory location or other direct memory access location or the like containing the procedure arguments and the length of the arguments. The server 738 may initiate a direct memory access operation or the like to copy the procedure arguments in the descriptor to local memory for the server 738. As part of this message payload, the client 708 may prepend another descriptor (cmd_buf_desc) that stores an identifier for the procedure to be executed, a maximum size of the arguments that can be returned, and any other information necessary or helpful for the server 738 to handle the interprocessor procedure call.

The server 738 may execute the requested procedure locally using any arguments passed by the client 708 as describe above. If there are any return arguments, the server 738 may initiate another direct memory operation (e.g., a direct memory write) or the like to copy the data back to client 708 before signaling the completion of the procedure along with the response descriptor (resp_buf_desc) prepended to the returned data. The server 738 may also usefully append a magic value to the end of the buffer, e.g., a unique value that the client 708 can use to detect when the transfer of return arguments is complete. The response descriptor may also contain an instance of the magic value for evaluation by the client 708, along with an indication of the return payload length.

Figure 9:
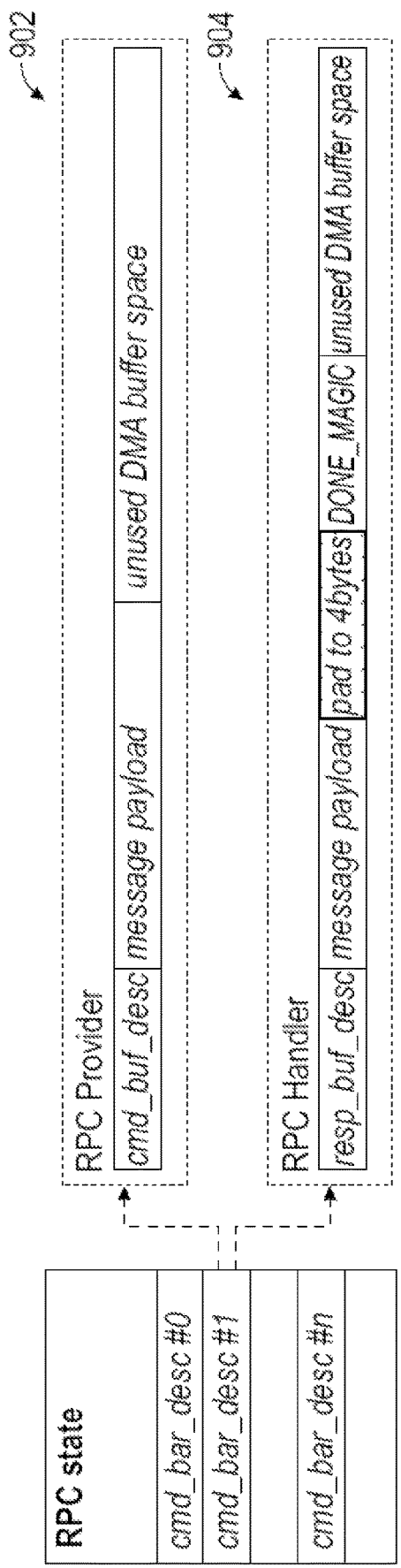
FIG. 9 illustrates messaging for an interprocessor procedure call.

FIG. 9 illustrates descriptors for an interprocessor procedure call. More specifically, FIG. 9 illustrates a descriptor 902 from a client, such as the client 708 described above (also referred to as a provider) and a response descriptor 904 from a server, such as the server 738 described above (also referred to as a handler) exchanged through the shared memory, such as the shared memory 740 described above. The separation of descriptors (e.g., descriptor 902) into three different portions as illustrated advantageously permits optimization of the transfer from a network processing unit for the server 738 to the client 708 in a manner that avoids PCIe reads, which may otherwise add significant latency to the exchange of the messages. In one aspect, each procedure call may include an explicit indicator of priority or an implicit indicator of priority (e.g., based on the type of procedure). The server 738 may execute low priority calls in an interruptible context while executing high priority calls as soon as possible in higher priority processing context. In another aspect, each server 738 thread may be separated out to a different processing core to improve latency.

Figure 10:
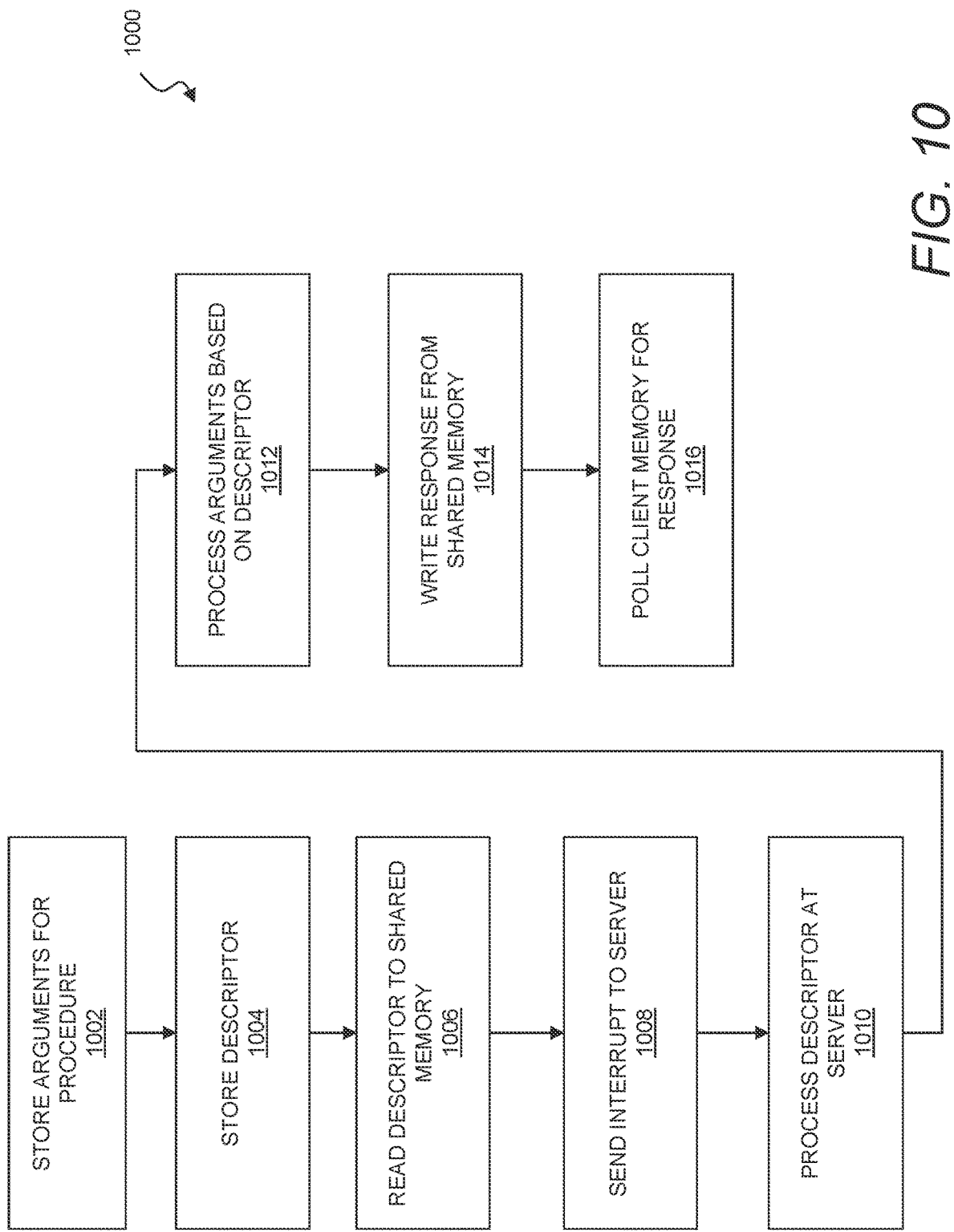
FIG. 10 is a flow chart of a method for an interprocessor procedure call.

FIG. 10 is a flow chart of a method for an interprocessor procedure call. This may generally include executing an interprocessor procedure call between two processors coupled by a local hardware bus as generally described herein.

As shown in step 1002, the method 1000 may include storing one or more arguments for the interprocessor procedure call in a first memory of a first kernel of a first processor. The first processor may for example include a general processing unit such as an x86 architecture processor or the like executing on a firewall that manages network traffic for an enterprise network. More generally, the first processor may be any processor that might advantageously offload processing to one or more other processing units locally coupled to the first processor via a hardware bus or the like capable of sharing memory in a configuration that can reduce interprocessor messaging as described herein. In one aspect, the hardware bus may include a PCIe bus conforming to the Peripheral Component Interconnect Express standard.

As shown in step 1004, the method 1000 may include storing a descriptor for the interprocessor procedure call in the first memory. The descriptor may be any of the descriptors described herein, and may include data to facilitate processing of the procedure such as an identifier for a procedure requested in the interprocessor procedure call and a location for the one or more arguments in the first memory. The descriptor may also or instead usefully specify a length of the one or more arguments, and/or a maximum length of return arguments permitted for the interprocessor procedure call. In general, the procedure specified in the descriptor may be any procedure that might usefully be performed by a network processing unit that supports operation of a firewall, e.g., by managing network flows for the firewall, or any other procedure that might usefully be offloaded to a second processor connected via a local hardware bus to a first processor and sharing memory with the first processor.

Storing the descriptor may include storing the descriptor in a ring buffer or any other suitable memory structure or the like. Where a ring buffer is used, the method 1000 may include incrementing an index of the ring buffer for each interprocessor procedure call requested by the first processor. While a ring buffer provides a useful data structure for storing and exchanging sequences of procedure calls, any other suitable memory structure or technique may be employed, preferably that maintains low latency be reducing or eliminating explicit interprocessor messaging traffic.

As shown in step 1006, the method 1000 may include reading the descriptor from the first memory to a second memory of a second kernel of a second processor coupled to the first processor over the local hardware bus. The second processor may include a network processing unit executing on a network processor that shares management of network traffic with the firewall, or otherwise supports operations of the firewall or some other host device. Reading the descriptor may, for example, include initiating a direct memory access read with the first processor to transfer data from the first memory to the second memory.

As shown in step 1008, the method 1000 may include sending an interrupt from the first processor to the second processor. The interrupt may be a hardware interrupt to the second processor indicating a request for execution of the interprocessor procedure call. A hardware interrupt provides a useful, independent channel for communicating the presence of a new procedure call from the client available for handling by a remote server, however any other suitable interprocessor messaging technique may be used, consistent with the desired performance of the distributed processing system. In one aspect, the interrupt may be a variable interrupt used to signal, e.g., different priorities for different procedure calls, or to explicitly or implicitly communicate any other useful information associated with a call. For example, the interrupt may be selected by the first processor from among at least a low priority interrupt and a high priority interrupt, and the second processor may preferentially process procedures associated with the high priority interrupt over procedures associated with the low priority interrupt.

As shown in step 1010, the method 1000 may include processing the descriptor with the second processor. This may occur in response to receiving the interrupt at the second processor (e.g., at the server), and may include copying (e.g., with a direct memory access read or similar mechanism) the one or more arguments from the location in the descriptor to the second memory of the second processor if this data has not already been transferred to the shared memory. In this context, copying the one or more arguments from the location may include initiating a direct memory access read from the location with the second processor.

As shown in step 1012, the method 1000 may include processing the one or more arguments in the second kernel of the second processor using the procedure specified by the indicator. In general, the procedure may be any function, procedure, or the like executable by the second processor either alone or in combination with other processing resources. In one aspect, this may be a procedure supporting operation of the firewall or providing management of network flows through a network processing unit according to firewall rules.

As shown in step 1014, the method 1000 may include writing a response to the interprocessor procedure call from the second processor to a location in the first memory of the first processor, such as the location in the first memory containing the one or more arguments for the interprocessor procedure call stored by first processor. The re-use of this location permits conservation of memory, and provides a specific location for the first processor to poll locally when waiting for a response to the procedure call. In one aspect, writing the response to the interprocessor procedure call may include initiating a direct memory access write from the second memory to the first memory.

The response may, for example, include a first instance of a unique value at a first position in the response, where the first position is allocated to identifying a code for signaling a completion of the procedure. The response may also include a second instance of the unique value at a second position in the response, where the second position is allocated to signaling the completion of the procedure. In general, the unique value may be any binary sequence useful for signaling completion of the requested procedure. The unique value may be created by the server after completion of the procedure so that the server can ensure the unique value does not accidentally appear elsewhere in the response data, and then repeated so that the client can identify the unique value (e.g., based on the first instance) and verify completion of the procedure (e.g., based on the second instance). While the unique value might naturally appear at a beginning and end of the response data, any other predetermined location(s) within the response data may also or instead be used. While a unique value provides a useful medium for signaling completion of the procedure, other techniques may also or instead be used for the response data to self-identify completion of the requested procedure, or to otherwise signal completion of the requested procedure in a manner consistent with the scalable, low-latency requirements of a particular implementation.

As shown in step 1016, the method 1000 may include polling the first memory of the client for a response to the interprocessor procedure call. This may include polling the first memory for a change in data stored at the location specified for the response, or more specifically for the unique value used by the second processor to signal completion of the procedure to the first processor. Although illustrated as occurring after the response is written from the shared memory, the polling may begin any time after the descriptor is stored by the client or transferred to the shared memory (or sooner, although no response would be expected). The polling may occur at any suitable frequency. As a significant advantage, polling for a response on the client side, e.g., for the unique value indicating completion of the requested procedure, permits the client to receive a response to the request without any need for explicit messaging (and the associated latency) between the client and server using the shared hardware bus.

According to the foregoing, there is further disclosed herein a system for interprocessor procedure calls. The system may generally include a first processor, a second processor, and a hardware bus locally coupling the first processor and the second processor in a communicating relationship. The first processor may include a first kernel with a first memory accessible to external resources and the first processor may execute a client configured to request a procedure from a remote processor with an interprocessor procedure call. The second processor may include a second kernel with a second memory, and may host a server for the interprocessor procedure call. The first processor may store arguments for the interprocessor procedure call in the first memory and signal a request for the interprocessor procedure call with a hardware interrupt from the first processor to the second processor over the hardware bus. The second processor may be configured (e.g., by computer executable code stored in a memory) to read the arguments from the first memory of the second processor, to process the arguments according to the procedure, and to write a response to the interprocessor procedure call to the first memory of the first processor.

The first processor may, for example, be a general processing unit of a host executing a firewall for an enterprise network. The second processor may be a network processing unit processing network flows for the firewall. The first memory may be a direct memory access memory accessible to external devices through the hardware bus without supervision by the first processor.

Figure 11:
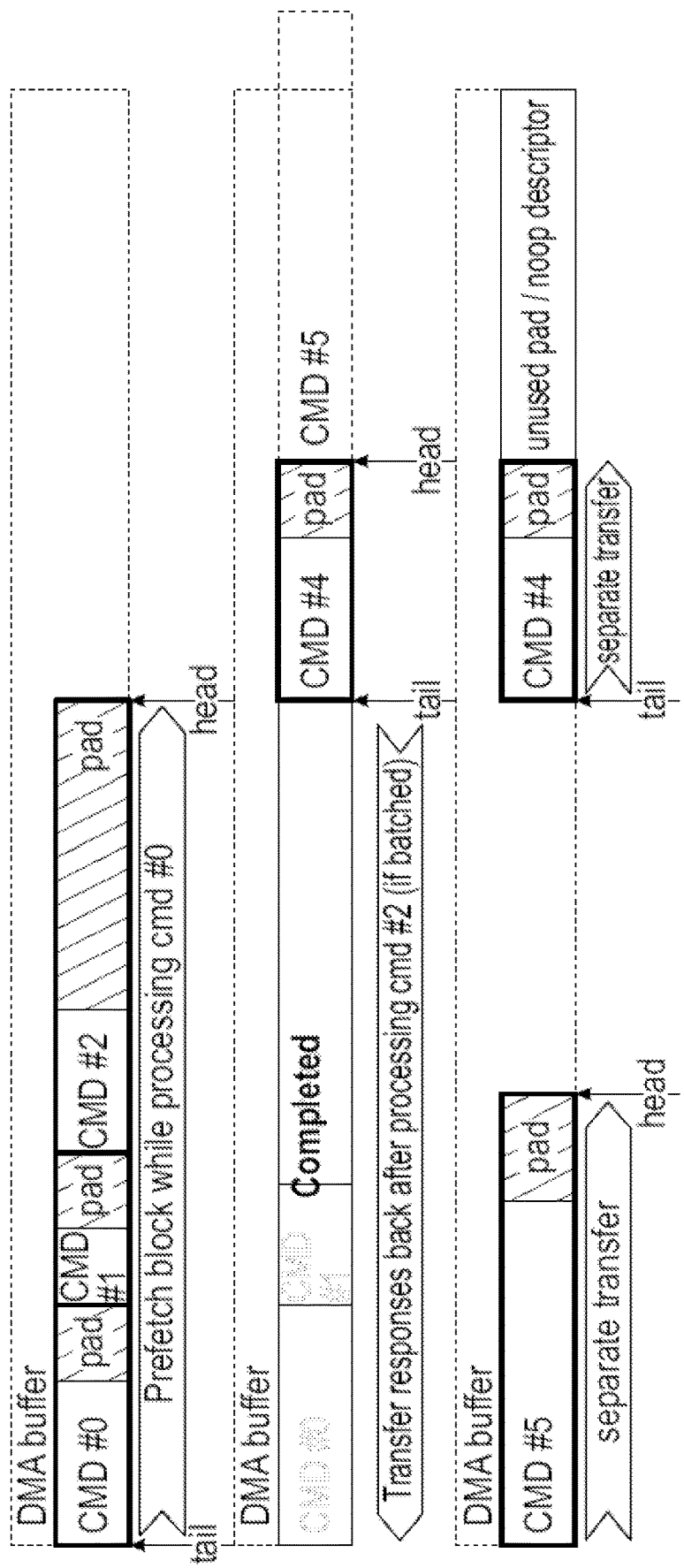
FIG. 11 illustrates messaging for batched procedure calls.

FIG. 11 illustrates messaging for batched procedure calls. As a further optimization of the techniques described above, multiple procedure calls can be transferred as a single direct memory access operation. In an embodiment, the server may copy calling arguments (or responses) for multiple calls within a larger contiguous data block using the data structures illustrated in FIG. 11. In this manner, the server can access to multiple payloads using any suitable limits on size or number such as up to the number of calls already queued, up to a boundary of a client data block, or up to a preset batch limit. To facilitate this protocol, the server may detect when there are additional calls available for processing by looking at the difference between the producer/head and consumer/tail indices, as illustrated in FIG. 11.

This scheme allows batching of reads from and writes to the client memory, for example, so that a processor from a client may batch a plurality of interprocessor procedure calls and request processing of the plurality of interprocessor procedure calls with a single interrupt. Typically, a batch from the first processor to the second processor will benefit from being as large as possible, whereas a batch from the second memory to the first memory may increase latency for a specific procedure call while waiting for other called procedures to execute. The batch size may be tunable, and may be different for each server platform. In one aspect, a no-op descriptor may serve as a BAR descriptor with a flag set to indicate a NO-OPERATION to prevent the unused space in the DMA buffer from being transferred. To use a single direct memory access buffer large enough for a single ring, the direct memory access buffer may be sized for all the descriptors, e.g., with a buffer size set to the number of descriptors per ring times the maximum data size for a call. However, this may be too large as a practical matter, because many procedure calls have been observed to be significantly smaller than the maximum data size. Empirically, a factor of four appears to be sufficient, suggesting a buffer size of about one fourth this maximum potential size.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionalities may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A computer program product for executing an interprocessor procedure call between two processors coupled by a local hardware bus, the computer program product comprising non-transitory computer executable code embodied in a computer readable medium that, when executing on one or more computing devices, performs the steps of:
    storing one or more arguments for the interprocessor procedure call in a first memory of a first kernel of a first processor;
    storing a descriptor for the interprocessor procedure call to a ring buffer in the first memory, the descriptor including an identifier for a procedure requested in the interprocessor procedure call and a location for the one or more arguments in the first memory;
    reading the descriptor from the first memory to a second memory of a second kernel of a second processor coupled to the first processor over the local hardware bus;
    sending an interrupt from the first processor to the second processor, the interrupt indicating a request for execution of the interprocessor procedure call;
    in response to receiving the interrupt at the second processor, processing the descriptor with the second processor, wherein processing the descriptor includes copying the one or more arguments from the location in the descriptor to the second memory of the second processor;
    processing the one or more arguments in the second kernel of the second processor using the procedure specified by the indicator; and
    writing a response to the interprocessor procedure call from the second processor to the location in the first memory of the first processor, the response including a first instance of a unique value at a first position in the response allocated to identifying a code for signaling a completion of the procedure and a second instance of the unique value at a second position in the response allocated to signaling the completion of the procedure.

2. The computer program product of claim 1, wherein reading the descriptor from the first memory includes initiating a direct memory access read with the first processor.

3. The computer program product of claim 1, wherein copying the one or more arguments from the location includes initiating a direct memory access read from the location with the second processor.

4. The computer program product of claim 1, wherein writing the response to the interprocessor procedure call includes initiating a direct memory access write from the second memory to the first memory.

5. The computer program product of claim 1, wherein the first processor is a general processing unit executing on a firewall that manages network traffic for an enterprise network.

6. The computer program product of claim 5, wherein the second processor is a network processing unit executing on a network processor sharing management of the network traffic with the firewall.

7. A method for executing an interprocessor procedure call between two processors coupled by a hardware bus, the method comprising:
  storing one or more arguments for the interprocessor procedure call in a first memory of a first kernel of a first processor;
  storing a descriptor for the interprocessor procedure call to the first memory, the descriptor including an identifier for a procedure requested in the interprocessor procedure call and a location for the one or more arguments in the first memory;
  reading the descriptor from the first memory to a second memory of a second processor coupled to the first processor through the hardware bus;
  sending an interrupt from the first processor to the second processor, the interrupt indicating a request for execution of the interprocessor procedure call;
  in response to receiving the interrupt at the second processor, copying the one or more arguments from the location of the first memory in the descriptor to the second memory of the second processor and processing the one or more arguments in a second kernel of the second processor using the procedure specified by the indicator; and
  writing a response to the interprocessor procedure call from the second processor to the first memory of the first processor.

8. The method of claim 7, wherein the response includes a first instance of a unique value at a first position in the response used to identify a code for signaling a completion of the procedure and a second instance of the unique value at a second position in the response used to signal the completion of the procedure.

9. The method of claim 7, wherein the hardware bus includes a PCIe bus.

10. The method of claim 7, wherein storing the descriptor includes storing the descriptor in a ring buffer in the first memory.

11. The method of claim 10, wherein the first processor increments an index of the ring buffer for each interprocessor procedure call requested by the first processor.

12. The method of claim 7, wherein the descriptor specifies a length of the one or more arguments.

13. The method of claim 7, wherein the descriptor specifies a maximum length of return arguments for the interprocessor procedure call.

14. The method of claim 7, wherein writing the response to the interprocessor procedure call includes writing the response from the second processor to the location in the first memory containing the one or more arguments for the interprocessor procedure call stored by first processor.

15. The method of claim 7, wherein the descriptor includes a unique value to be used by the second processor to signal completion of the procedure to the first processor.

16. The method of claim 7, further comprising polling the first memory with the first processor for a presence of the response to the interprocessor procedure call.

17. The method of claim 16, wherein polling the first memory includes polling the first memory for a change in data stored at the location.

18. The method of claim 16, wherein polling the first memory includes polling the first memory for a unique value used by the second processor to signal completion of the procedure to the first processor.

19. The method of claim 7, wherein the interrupt is selected by the first processor from among at least a low priority interrupt and a high priority interrupt, wherein the second processor preferentially processes procedures associated with the high priority interrupt over procedures associated with the low priority interrupt.

20. The method of claim 7, wherein the first processor batches a plurality of interprocessor procedure calls and requests processing of the plurality of interprocessor procedure calls with a single interrupt.

21. A system comprising:
  a first processor including a first kernel with a first memory accessible to external resources, the first processor executing a client configured to request a procedure from a remote processor with an interprocessor procedure call;
  a second processor including a second kernel with a second memory, the second processor hosting a server for the interprocessor procedure call; and
  a hardware bus locally coupling the first processor and the second processor in a communicating relationship, wherein the first processor stores arguments for the interprocessor procedure call in the first memory and signals a request for the interprocessor procedure call with a hardware interrupt from the first processor to the second processor over the hardware bus, and further wherein the second processor is configured to read the arguments from the first memory of the second processor, to process the arguments according to the procedure, and to write a response to the interprocessor procedure call to the first memory of the first processor.

22. The system of claim 21, wherein the first processor is a general processing unit of a host executing a firewall for an enterprise network, and wherein the second processor is a network processing unit processing network flows for the firewall.

23. The system of claim 21, wherein the first memory is a direct memory access memory accessible to external devices through the hardware bus without supervision by the first processor.

* * * * *